| United States Patent [19] | [11] Patent Number: 4,964,960 |
| --- | --- |
| Keating et al. | [45] Date of Patent: Oct. 23, 1990 |

[54] CATION EXCHANGE REINFORCED MEMBRANE AND PROCESS FOR USING

[75] Inventors: James T. Keating, Wilmington; Stephen A. Perusich, Newark, both of Del.

[73] Assignee: E. I. du Pont de Nemours and Company, Wilmington, Del.

[21] Appl. No.: 316,630

[22] Filed: Feb. 28, 1989

[51] Int. Cl.$^5$ .................. C25B 1/16; C25B 1/26; C25B 13/08

[52] U.S. Cl. ..................... 204/98; 204/128; 204/296; 521/27

[58] Field of Search .............. 204/98, 128, 296; 521/27

[56] References Cited

U.S. PATENT DOCUMENTS

| | | | |
|---|---|---|---|
| 3,985,501 | 10/1976 | Grot et al. | 8/115.5 |
| 4,326,046 | 4/1982 | Miyaka et al. | 525/276 |
| 4,437,951 | 3/1984 | Bissot et al. | 204/98 |
| 4,506,035 | 3/1985 | Barnett et al. | 521/53 |
| 4,586,992 | 5/1986 | Miyake et al. | 204/296 |

FOREIGN PATENT DOCUMENTS

| | | |
|---|---|---|
| 57-25330 | 7/1980 | Japan . |
| 58-37030 | 3/1983 | Japan . |
| 60-26141 | 6/1985 | Japan . |
| 62-210336 | 8/1987 | Japan . |

*Primary Examiner*—John F. Niebling
*Assistant Examiner*—Kathryn Gorges
*Attorney, Agent, or Firm*—Craig H. Evans

[57] ABSTRACT

A fluorinated cation exchange membrane comprising one or more layers of an ion-conductive film and where one or more layers has adhered therein a fabric reinforcement made from fully ion conductive yarn that is oriented and then at least partially hydrolyzed, the film and the yarns being made of melt-fabricable fluorinated cation exchange resin precursors having a mole ratio of non-functional to functional monomer of 2.8–11.8:1, the mole ratio in the film adjacent to the fabric being different from that of the fabric by no more than three units, where the membrane is employed in the process of electrolyzing alkali metal halides.

8 Claims, No Drawings

CATION EXCHANGE REINFORCED MEMBRANE AND PROCESS FOR USING

Fluorinated cation exchange membranes are widely used in the electrolysis of alkali metal chlorides, among other uses. Lower voltage—i.e., lower membrane resistance—and higher current efficiency are greatly desired, because these two factors determine the amount of electrical power required for the electrolysis.

Wet cation exchange membranes have rather poor tear strength, and nearly all of them are now fabric-reinforced, though considerable work has been done with unreinforced films and with fibril-reinforced films. The reinforcement is usually made of perfluorinated polymers, such as homopolymers and melt-fabricable copolymers of tetrafluoroethylene (TFE), because they have enough chemical resistance to withstand exposure to caustic and chlorine. In some cases, as taught in U.S. Pat. No. 4,437,951, sacrificial yarns may also be used for special advantages.

Perfluorinated fabrics have some disadvantages, since they block the straight flow of cations through the membrane, increase the resistance of the membrane, and result in uneven current distribution within the membrane. Also, when a melt-processible precursor to a cation exchange resin, which usually contains pendant groups ending in $-SO_2F$ or $-COOR$ groups, is laminated to a non-functional fabric, the functional polymer expands during hydrolysis and use, while the reinforcement does not. This can result in puckering of the film in the "window" areas between reinforcing yarns. This puckering is undesirable because it makes leak-tight sealing of the membrane in an electrolysis cell more difficult and provides recesses and protrusions that can trap gas which hinders ion flow.

Some consideration has been given to replacing the perfluorinated fabric with a cation exchange resin, but no really feasible process has yet been disclosed for making such a membrane.

U.S. Pat. No. 3,985,501 describes the melt spinning of an oriented filament of a perfluoropolymer with side chains terminating in $-SO_2F$ groups, followed by weaving into a liquid-impermeable fabric, followed by hydrolysis to the cation exchange form. This fabric was not used for reinforcing a cation exchange film laminate. When an oriented unhydrolyzed yarn such as this is used to weave a fabric, the elasticity of the yarns causes the yarns in the fabric to become shorter when the fabric is removed from the loom, causing the fabric to pucker into a crepe fabric and causing further shrinkage in the laminator. Such a fabric with built-in strain is undesirable for use in reinforcing a cation exchange membrane.

Japanese Laid-open Application No. J57/25330 replaces part but not all of the non-functional perfluorocarbon polymer yarns with unoriented cation exchange yarns. The cation exchange yarns do not strengthen the fabric but only stabilize it against distortion. The only example in this application gave a current efficiency of 94% and an electrode-to-electrode voltage of 3.46 volts.

SUMMARY OF THE INVENTION

The present invention is a fluorinated cation exchange membrane having improved tear strength over one made from unreinforced film and improved conductivity over one made from film reinforced with non-conductive materials, such as PTFE, consisting essentially of a fully ion-conductive fabric heat-laminated to at least one film of at least one melt-processible fluorinated cation exchange resin precursor in which the mole ratio of TFE to functional monomer is 2.8–11.8 to 1, in such a way that the mole ratio of TFE to functional monomer in the film adjacent to the fabric is the same as that of the fabric, plus or minus 3, preferably plus or minus 1. The fabric may be tightly woven without adversely affecting conductivity since, once the membrane laminate containing the fabric is hydrolyzed, the fabric is essentially fully ion-conductive.

The process for making this membrane comprises the following steps:

(1) a melt-processible yarn made of a fluorinated cation exchange resin precurser is oriented, preferably by being stretched or drawn to at least two times its original length (1x), sufficiently to provide a minimum tenacity of 0.5 grams per denier (g/denier) after hydrolysis. After being oriented, the yarn has a denier between 50 and 400 grams per 9000 meters. The fluorinated cation exchange resin precursor from which the yarn is made has a mole ratio of non-functional monomer, preferably TFE, to functional monomer of 2.8–11.8 to 1.

(2) the oriented yarn is hydrolyzed at least to the degree required to provide a minimum tensile modulus of 2 g/denier;

(3) the hydrolyzed yarn is then made into a fabric which is essentially fully ion-conductive in use; the fabric preferably woven having a yarn count of from 1 to 30 yarns per centimeter, preferably 20 to 30 yarns per centimeter;

(4) the fabric is heat-laminated to at least one film of at least one melt-processible fluorinated cation exchange resin precursor in which the mole ratio of TFE to functional monomer is 2.8–11.8 to 1, in such a way that the mole ratio of TFE to functional monomer in the film adjacent to the fabric is the same as that of the fabric, plus or minus 3, preferably plus or minus 1; and then (5) the laminate is hydrolyzed.

An improved process requiring less energy for electrolyzing an alkali metal halide such as sodium chloride to make a halogen such as chlorine and an alkali metal hydroxide such as sodium hydroxide (NaOH) has been found; the improvement being the use of the membrane of this invention. The membrane can also be used in fuel cells and in nonelectrolytic separation processes such as ion exchange, for example dialysis.

DETAILS OF THE INVENTION

The reinforcing yarns and fabric may be made of a carboxylic polymer, a sulfonic polymer, or a combination of the two. The same is true of the films which are laminated to the fabric to make the membrane, but it is preferred that the layer of the membrane which is mounted next to the catholyte be made of a carboxylic polymer particularly when manufacturing caustic of 20–40 weight percent (wt. %). Preferably the reinforcing yarns will be made of the same polymer as the adjacent film.

The carboxylic polymers with which the present invention is concerned have a fluorocarbon backbone chain to which are attached the functional groups or pendant side chains which in turn carry the functional groups. When the polymer is in melt-fabricable form, the pendant side chains can contain, for example,

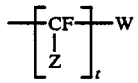

groups wherein Z is F or $CF_3$, t is 1 to 12, and W is —COOR or —CN, wherein R is lower alkyl. Preferably, the functional group in the side chains of the polymer will be present in terminal

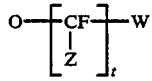

groups wherein t is 1 to 3.

The term "fluorinated polymer", used herein for carboxylic and for sulfonic polymers, means a polymer in which, after loss of any R group by hydrolysis to ion exchange form, the number of F atoms is at least 90% of the total number of F, H, and Cl atoms in the polymer. For chloralkali cells, perfluorinated polymers are preferred, though the R in any COOR group need not be fluorinated because it is lost during hydrolysis.

Polymers containing $$-(OCF_2CF)_m OCF_2 CFCN$$
$$\quad\ \ |\qquad\qquad\ \ |$$
$$\quad CF_3\qquad\qquad CF_3$$

side chains, in which m is 0, 1, 2, 3 or 4, are disclosed in U.S. Pat. No. 3,852,326.

Polymers containing $-(CF_2)_p COOR$ side chains, where p is 1 to 18, are disclosed in U.S. Pat. No. 3,506,635.

Polymers containing $$-(OCF_2CF)_m OCF_2 COOR$$
$$\quad\ \ |$$
$$\quad Z$$

side chains, where Z and R have the meaning defined above 20 and m is 0, 1, or 2 (preferably 1) are disclosed in U.S. Pat. No. 4,267,364.

Polymers containing terminal $-O(CF_2)_v W$ groups, where W is as defined above and v is from 2 to b 12, are preferred. They are disclosed in U.S. Pat. Nos. 3,641,104, 4,178,218, 4,116,888, British No. 2,053,902, EP No. 41737 and British No. 1,518,387. These groups may be part of

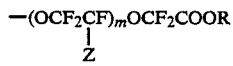

side chains, where Y=F, $CF_3$ or $CF_2Cl$. Especially preferred are polymers containing such side chains where v is 2, which are described in U.S. Pat. Nos. 4,138,426 4,487,668, and where v is 3, which are described in U.S. Pat. No. 4,065,366. Among these polymers, those with m=1 and Y=$CF_3$ are most preferred.

The above references describe how to make these polymers.

The sulfonyl polymers with which the present invention is concerned are fluorinated polymers with side chains containing the group

wherein $R_f$ is F, Cl, $CF_2Cl$ or a $C_1$ to $C_{10}$ perfluoroalkyl radical, and X is F or Cl, preferably F. Ordinarily, the side chains will contain $-OCF_2CF_2CF_2SO_2X$ or $-OCF_2CF_2SO_2F$ groups, preferably the latter. For use in chloralkali membranes, perfluorinated polymers are preferred.

Polymers containing the side chain

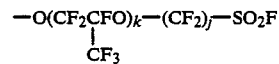

where k is 0 or 1 and j is 3, 4, or 5, may be used. These are described in British No. 2,053,902.

Polymers containing the side chain $-CF_2CF_2SO_2X$ are described in U.S. Pat. No. 3,718,627.

Preferred polymers contain the side chain

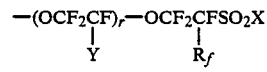

where Rf, Y, and X are as defined above and r is 1, 2, or 3, and are described in U.S. Pat. No. 3,282,875. Especially preferred are copolymers containing the side chain

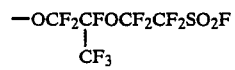

Polymerization can be carried out by the methods described in the above references. Especially useful is solution polymerization using $ClF_2CCFCl_2$ solvent and $(CF_3CF_2COO)_2$ initiator. Polymerization can also be carried out by aqueous granular polymerization as in U.S. Pat. No. 2,393,967, or aqueous dispersion polymerization as in U.S. Pat. No. 2,559,752 followed by coagulation as in U.S. Pat. No. 2,593,583.

The copolymers used herein should be of high enough molecular weight to produce films which are self-supporting in both the melt-fabricable precursor form and in the hydrolyzed ion-exchange form.

A membrane having at least one layer of a copolymer having sulfonyl groups in melt-fabricable form and a layer of a copolymer having carboxyl groups in melt-fabricable form, such as made by coextrusion, can be used as one of the component films in making the membrane of the invention. Such a laminated structure may be referred to as a bimembrane. Preparation of bimembranes is described in Japanese Laid-open Application No. K52/36589, published for opposition as No. J83/33249.

The customary way to specify the structural composition of films or membranes in this field is to specify the polymer composition, the ion-exchange capacity or equivalent weight or ratio of nonfunctional to functional monomer, and the thickness of the polymer films in melt-fabricable form from which the membrane is fabricated. This is done because the measured thickness varies depending on whether the membrane is dry or swollen with water or an electrolyte, and even on the ionic species and ionic strength of the electrolyte, even though the amount of polymer remains constant.

For use in ion exchange applications and in cells, for example a chloralkali cell for electrolysis of brine, the membrane should have all of the functional groups converted to ionizable functional groups. These will be sulfonic acid and carboxylic acid groups, or preferably alkali metal salts thereof. When the term "sulfonic ion-exchange groups" is used, it includes not only the sulfonic acid group but particularly the alkali metal salts thereof. Similarly, the term "carboxylic ion-exchange groups" means the carboxylic acid group and particularly the alkali metal salts thereof. The alkali metals preferred for use in this invention are potassium and sodium, particularly sodium, which leads to the production of sodium hydroxide.

Conversion to ionizable functional groups is ordinarily and conveniently accomplished by hydrolysis with acid or base, such that the various functional groups described above in relation to the melt-fabricable polymers are converted respectively to the free acids or the alkali metal salts thereof. Such hydrolysis can be carried out in an aqueous bath of mineral acid or alkali metal hydroxide. Hydrolysis in the hydroxide is preferred as it is faster and more complete. Use of hot hydrolysis baths, such as near the boiling point of the solution, is preferred for rapid hydrolysis. The time required for hydrolysis increases with the thickness of the structure. It is advantageous to include a water-miscible organic compound such as dimethyl sulfoxide (DMSO) in the hydrolysis bath, to swell the membrane to increase the rate of hydrolysis.

Membranes usually have an overall thickness of 50–250 micrometers, especially 125–200 micrometers.

The carboxylic and sulfonic polymers used in this invention for both the yarns and for the films which are used in making the membrane have a mole ratio of TFE to functional monomer of 2.8–11.8 to 1, preferably 5.3–7.5 to 1. If the ratio is lower than 2.8 to 1, the copolymer will tend to be soft and difficult to handle and have an excessively high water absorption. If the ratio is higher than 11.8 to 1, the membrane will have a high resistance (high voltage).

Those skilled in the art will realize that the optimum mole ratio will depend on the structure of the polymer or polymers used in the membrane. For example, if the pendant side chain containing the functional group is short, relatively high mole ratios may be used. If the thickness of the membrane is at the high end of the range mentioned, the resistance will be relatively high, and low mole ratios will be desired. If the membrane is carboxylic rather than sulfonic, the resistance will be relatively high, and low mole ratios will be desired. If caustic outside the 30–35 wt. % range is desired, high mole ratios in the range 7.5–8.5 to 1 may be preferred.

The fabric may be heat set and/or calendered. The hydrolyzed yarns may be made into a fabric by any known method such as knitting or weaving. They may be woven into fabric using various weaves, such as the plain weave, basket weave, leno weave, or others. The yarns used in the support fabrics may be monofilament yarns or multifilament yarns. They may be of ordinary round cross-section or may have specialized cross-sections. Oblong or rectangular cross-sections, if suitably oriented to the membrane, make it possible to get more reinforcing action with a thinner overall membrane.

While not preferred, it is possible to use soluble or degradable fibers, such as rayon or polyester, along with the functional fibers. They may be used because these fibers are solubilized or degraded during final hydrolysis and use of the assembled membrane thus making all parts of the membrane essentially fully ion-conductive. Care should be taken, however, not to have the soluble or degradable fibers extend from one surface to the other, or the non-porous membrane will become a porous diaphragm and, in the case of a chloralkali cell, the caustic product will contain too much salt. In a bimembrane, the fabric may be in the sulfonic or carboxylic layer or both, but is more often in the sulfonic layer, which is usually thicker.

The fabric preferably is woven and, since the yarn is essentially fully ion-conductive after final hydrolysis and use of the assembled membrane, the weave used in the fabric and the yarn count preferably are such that the fabric is tightly woven for greater strength. Preferred yarn counts are from 1 to 40 yarns per centimeter in each direction, more preferably from 25 to 35.

The yarns must be oriented before hydrolysis, but the orientation process is not critical.

Orientation can be done by drawing during spinning as the yarn comes from the spinneret. Yarn may also be oriented by drawing in a separate step after spinning is finished. While being stretched, the yarn is heated on a hot surface, through a heated tube, or by passing through steam. The amount of stretching or drawing should not be so great as to cause breaks in constituent filaments of multifilament yarns. The degrees of orientation and hydrolysis should be adequate to give a minimum tenacity of 0.5 g/denier and a minimum tensile modulus of 2 g/denier after hydrolysis and superficial drying. If the tenacity is too low, filament or yarn breaks may occur on the loom. If the tensile modulus is too low, the fabric will tend to pucker on release from the loom, causing the fabric to be like a crepe.

Hydrolyzed cation exchange yarn is several times as stiff as unhydrolyzed yarn made of the precursor resin, as shown in the Examples.

The method of laminating the cation exchange precursor film or films to the cation exchange fabric is not critical. Several methods have been disclosed in the art, including that used in the Examples.

The membrane or bimembrane may be used flat in various known filter press cells, or may be shaped around an electrode. The latter is especially useful when it is desired to convert an existing diaphragm cell to a membrane cell in order to make higher quality caustic.

Membranes can be swelled with polar solvents (such as lower alcohols or esters, tetrahydrofuran, or chloroform) and then dried, preferably between flat plates, to improve their electrolytic performance. Before mounting in commercial cell support frames, which may be 1–3 meters on a side, the membrane can be swelled so that it will not wrinkle after it is clamped in the frame and exposed to electrolytic fluids. Among the swelling agents that can be used are water, brine, caustic, lower alcohols, glycols, and mixtures thereof.

The cell can have two or three compartments, or even more. If three or more compartments are used, the membrane is commonly used next to the cathode compartment, and the other dividers may be porous diaphragms or membranes based on polymers having pendant side-chains with terminal —$CF_2SO_3$— ion exchange groups only.

Bipolar or monopolar cells can be used. In ordinary use, the carboxylic side of the membrane will face the cathode. One can use (n) cells in series, with anolyte flowing from first cell (1) to cell (n) and catholyte flowing from cell (n) to cell (1). The cells may use identical membranes or different membranes may be used in different cells. Membranes using only polymers having pendant side chains with terminal —$CF_2SO_3$— groups may be used in cell (n) and possibly others near it. Cell (n) may be two or more cells in parallel.

The membrane may be disposed horizontally or vertically in the cell, or at any angle from the vertical.

Any of the conventional electrodes or electrode configurations may be used. The anode for a chloralkali cell should be resistant to corrosion by brine and chlorine, resistant to erosion, and preferably should contain an electrocatalyst to minimize chlorine overvoltage. The well-known dimensionally stable anode is among those that are suitable. A suitable base metal is titanium, and the electrocatalysts include reduced platinum group metal oxides (such as Ru, and the like) singly or in mixtures, optionally admixed with a reduced oxide of Ti, Ta, Nb, Zr, Hf, V, Pt, or Ir. The electrocatalysts may be heat treated for stability.

The anode may be a 'zero-gap' anode, against which the membrane is urged, the anode being permeable to both liquids and gases. Alternatively, the anode may be kept a small distance from the membrane by the use of a spacer, against which the membrane is urged by a small hydraulic head on the other side of the membrane. The spacer may be made of a plastic which is resistant to the chemicals in the anolyte, such as polytetrafluoroethylene, ethylene/tetrafluoroethylene copolymer, or polychlorotrifluoroethylene. It is desirable that the spacer or the electrode should have open vertical channels or grooves to facilitate the escape of gas evolved at the anode.

Whether or not there is a spacer, it may be desirable to have the anode openings slanted so the gas is carried away from the membrane and so that anolyte circulation past the membrane is maximized. This effect can be augmented by using downcomers for anolyte which has been lifted by the rising gas bubbles.

The anode may be a screen or a perforated plate or a powder, any of which may be partially embedded in the anode surface layer of the membrane. When the anode is embedded, the current may be supplied to the anode by current distributors which contact the anode at numerous closely-spaced points. The anode may be a porous catalytic anode attached to or pressed against the membrane or attached to or pressed against a porous layer, which is in turn attached to or pressed against the membrane.

The cathode for a chloralkali cell should be resistant to corrosion by the catholyte, resistant to erosion, and preferably contain an electrocatalyst to minimize hydrogen overvoltage. The cathode may be mild steel, nickel, or stainless steel, for example, and the electrocatalyst may be platinum black, palladium, gold, spinels, manganese, cobalt, nickel, Raney nickel, reduced platinum group metal oxides, alpha-iron and the like.

The cathode may be a 'zero-gap' cathode, against which the membrane is urged, the cathode being permeable to both liquids and gases. Alternatively, the cathode may be kept a small distance from the membrane by the use of a spacer, against which the membrane is urged by a small hydraulic head on the other side of the membrane. In the case of a three-compartment cell, both membranes may be urged against electrodes or spacers by a hydraulic head on the center compartment.

The spacer may be made of a plastic which is resistant to the chemicals in the catholyte, such as polytetrafluoroethylene, ethylene/tetrafluoroethylene resin, or polychlorotrifluoroethylene. It is desirable that the cathode spacer or electrode have open vertical channels or grooves to facilitate the escape of gas evolved at the cathode.

Whether or not there is a spacer, it may be desirable to have the cathode openings slanted so the gas is carried away from the membrane and catholyte flow past the membrane is maximized. This effect may be augmented by using downcomers for catholyte which has been lifted by rising gas bubbles. The cathode may be a porous cathode, pressed against the membrane or pressed against a porous layer, which is in turn attached to or pressed against the membrane.

An oxygen cathode can be used, in which oxygen is supplied to the cathode and substantially no hydrogen is evolved, with the result being lower cell voltage. The oxygen may be supplied either by bubbling through the catholyte and against the cathode, or by feeding oxygen-containing gas through a porous inlet tube which also serves as cathode and is coated with electrocatalyst.

It has long been known that in the electrolysis of brine to make chlorine and caustic, it is desirable to use sodium chloride (NaCl) having low calcium (Ca) and magnesium (Mg) content (hardness). It is also well known how to remove hardness from NaCl solutions to very low levels. Heavy metals (such as iron and mercury) and foreign anions (such as iodide and sulfate) should also be substantially removed. Some of the contaminants in make-up brine can be removed by passing the brine through a diaphragm cell before it is fed to the membrane cell system. Further hardness reductions can be achieved by passing the brine through a chelate ion exchanger, preferably one containing —$NHCH_2COOH$ groups, or a phosphate may be added to the brine to precipitate insoluble salts.

Brine fed to the cell is usually close to the saturation concentration, but lower brine concentration is acceptable. Brine leaving the anolyte chamber may be as low as about 2 wt. % NaCl, but is more often 10–15 wt. % NaCl, or even higher.

Because a bimembrane or three-layer membrane has lower electrical resistance than an all-carboxylic membrane, it can be operated at lower voltage or higher current density. Good results can be obtained at a current density of 1.0–7.0 kiloamperes per square meter ($kA/m^2$), preferably 3.0–5.0 $kA/m^2$.

It is desirable to acidify the anolyte to minimize the formation of oxygen and chlorate at the anode.

Anolyte acidity is normally adjusted to a value in the range of pH 1–5 by addition of hydrochloric acid or hydrogen chloride to the recycle brine. Recycle brine may be concentrated by addition of solid salt and/or by evaporating or distilling water from the stream.

While membrane cells are frequently operated at approximately atmospheric pressure, there can be advantages to operating them at elevated pressure. While direct current is ordinarily used in membrane cells, one can also use pulsed direct current or half-wave AC or rectified AC or DC with a square wave.

Chloralkali synthesis is normally carried out at about 70°–100° C. The catholyte can be kept 5°–20° cooler than the anolyte temperature.

In any of the above arrangements, either or both of the electrodes can have a catalytically active surface layer of the type known in the art for lowering the overvoltage of an electrode. Such electrocatalyst can be of a type known in the art, such as those described in U.S. Pat. Nos. 4,224,121 and 3,134,697, and UK No. 2,009,788A. Preferred cathodic electrocatalysts include platinum black, Raney nickel and ruthenium black. Preferred anodic electrocatalysts include platinum black and mixed ruthenium and titanium oxides.

The membranes described herein can also be modified on either surface or both surfaces thereof so as to have enhanced gas release properties, for example by providing optimum surface roughness or smoothness by hot roll embossing or by embossing with a porous paper. When embossing with a porous paper, a release paper can be applied to an outer surface of the membrane prior to passing through a laminator used, for example, to apply a reinforcement for the membrane. Such surface embossing is further described in U.S. Pat. No. 4,349,422. Preferably the resulting surface roughness is about 2–5 micrometers as measured, for example, on a Bendix Model 1020 profilometer.

Preferably, the gas release properties of the membranes are enhanced by providing thereon a gas-and liquid-permeable porous non-electrode layer. Such non-electrode layer can be in the form of a thin hydrophilic coating or spacer and is ordinarily of an inert electroinactive or non-electrocatalytic substance. Such a non-electrode layer should have a porosity of 10 to 99%, preferably 30 to 70%, and an average pore diameter of 0.01 to 2000 micrometers, preferably 0.1 to 1000 micrometers, and a thickness generally in the range of 0.1 to 500 micrometers, preferably 1 to 300 micrometers. A non-electrode layer ordinarily comprises an inorganic component and a binder; the inorganic component can be an inorganic compound which is chemically stable in hot concentrated caustic and chlorine, and can be of a type as set forth in UK No. 2,064,586, preferably tin oxide, titanium oxide, zirconium oxide, or an iron oxide such as $Fe_2O_3$ or $Fe_3O_4$. Other information regarding non-electrode layers on ion-exchange membranes is found in published European Patent Application No. 31660, and in Japanese Laid-open Patent Application Nos. 56-108888 and 56-112487. The particle size of the inorganic material can be about 1–100 micrometers, and preferably 1–10 micrometers.

The binder component in a non-electrode layer can be, for example, polytetrafluoroethylene, a fluorocarbon polymer at least the surface of which is hydrophilic by virtue of treatment with ionizing radiation in air or a modifying agent to introduce functional groups such as —COOH or —$SO_3H$ (as described in published UK Patent Application GB No. 2,060,703A) or treatment with an agent such as sodium in liquid ammonia, a functionally substituted fluorocarbon polymer or copolymer which has carboxylic or sulfonic functional groups, or polytetrafluoroethylene particles modified on their surfaces with fluorinated copolymer having acid type functional groups (GB No. 2,064,586). Such a binder can be used in an amount of about from 10 to 50 wt. % of the non-electrode layer or of the electrocatalyst composition layer. In addition to the inorganic component and the binder, the dispersion used to apply the inorganic component can include a thickener such as methyl cellulose or polyvinyl alcohol and a small amount of nonionic surfactant.

Composite structures having non-electrode layers thereon can be made by various techniques known in the art, which include preparation of a decal which is then pressed onto the membrane surface, spray application of a slurry or a liquid composition (for example, dispersion or solution) of the binder followed by drying, screen or gravure printing of compositions in paste form, hot pressing of powders distributed on the membrane surface, and other methods as set forth in British Patent No. 2,064,586 or Japanese Laid-open Patent Application No. J57/89490. Such structures can be made by applying the indicated layers onto membranes in melt-fabricable form, and by some of the methods onto membranes in ion-exchange form; the polymeric component of the resulting structures when in melt-fabricable form can be hydrolyzed in known manner to the ion-exchange form.

Membranes which carry thereon one or more non-electrode layers can be employed in an electrochemical cell regardless of the distances between the anode, the membrane, and the cathode. That is, they are useful in so called finite-gap, narrow-gap, and zero-gap configurations.

EXAMPLES

Example 1

A copolymer of TFE and $CF_2$=$CFOCF_2CF(CF_3)OCF_2CF_2SO_2F$ with a ratio of the two monomers of 6.6 was melt spun and melt drawn downward at a temperature of 300° C. through a 6-hole spinneret with a takeoff speed of 75 meters per minute (m/min). The yarn was drawn at a rate of 175 m/min at 300° C., resulting in a 233% elongation. The tensile properties of both drawn and undrawn ion exchange yarns were determined:

|  | Drawn | Undrawn |
| --- | --- | --- |
| Tenacity (g/denier) | 0.70 | 0.28 |
| Modulus (g/denier) | 1.1 | 0.5 |
| Orientation angle (degrees) | 15.1 | 18.3 |
| Apparent crystal size (nm) | 5.3 | 6.2 |
| Density (g/cm$^3$) | 2.004 | 2.005 |

These data show that drawing results in orientation, which increases tenacity.

Samples of both yarns were wound on an inert porous support and hydrolyzed overnight in a solution of 10% KOH, 30% dimethylsulfoxide, and 60% water. The yarns were then rinsed in water, dried in air, and tested for tensile properties:

|  | Drawn | Undrawn |
| --- | --- | --- |
| Tenacity (g/denier) | 0.71 | 0.38 |
| Modulus (g/denier) | 5.0 | 3.2 |
| Orientation Angle (degrees) | 26.5 | 33.3 |
| Apparent Crystal Size (nm) | 3.1 | 3.0 |
| Density (g/cm$^3$) | 1.830 | 1.862 |

These experiments show that tenacity is about doubled by melt drawing 2x, and modulus is increased 5–6 fold by hydrolysis to the potassium salt form. Thermal mechanical analysis showed that the hydrolyzed fibers displayed no visible contraction until 150° C., and only contracted 18% at the lamination temperature of 225° C. The contraction is much greater for the unhydrolyzed fibers.

Example 2

The drawn, hydrolyzed yarns made in Example 1 were woven into a fabric with 1.2 yarns/cm in the warp direction and 1.2 yarns/cm in the weft direction. The fabric did not lose its flatness when released from the loom. The fabric was laminated into a membrane by placing the fabric on a 25 micrometer thick film of the same polymer with a TFE:functional monomer mole ratio of 6.58:1, and placing on the fabric a melt-coextruded film containing a 100 micrometer layer of the same sulfonyl polymer and a 38 micrometer layer of a 6.4:1 mole ratio TFE:$CF_2$=$CFOCF_2CF(CF_3)OCF_2CF_2COOCH_3$ copolymer, in such a way that the —$SO_2F$ side rested on the fabric. The sandwich was inverted on a piece of porous release paper and heated radiantly from above at 225° C. while applying a vacuum of 71 kPa for 15 seconds through the release paper, which was removed after cooling.

A control for cell testing was made which was substantially the same except the fabric was made of polytetrafluoroethylene (PTFE) yarn of 200 denier. Tear test: Two samples made with drawn, hydrolyzed yarns as above, but of a copolymer of TFE and $CF_2$=$CFOCF_2CF(CF_3)OCF_2CF_2SO_2F$, and an unreinforced control membrane (identical except the fabric was omitted) were hydrolyzed in KOH/DMSO/water at 90° C., washed in water, and dried superficially—i.e., by blotting. They were then submitted to the Elmendorf Tear Resistance Test, ASTM D-1922, with the following results:

|  | Average Tear Resistance g/mm |
| --- | --- |
| Sample 1 | 548 |
| Sample 2 | 648 |
| Control | 291 |

This test shows that even with a very loose weave, the membrane of the present invention has about twice the tear resistance of the unreinforced control.

Electrolysis test:

Portions of a third sample membrane made by the above method and the PTFE reinforced control were hydrolyzed in KOH/DMSO/water at 90° C., washed in water, preswelled in 2% NaOH, and installed in identical laboratory cells with an effective membrane diameter of about 7.5 centimeters (cm). The cathode was mild steel, the anode was titanium activated with a coating containing ruthenium oxide, and the membrane was urged against the anode by catholyte head. Purified brine was used. Electrolysis was carried out at 90° C. and 3.1 kA/m² current density to make 32 wt. % NaOH. The results were:

|  | Sample | Control |
| --- | --- | --- |
| Days on line | 25 | 21 |
| Final caustic current efficiency (%) | 97.5 | 97.0 |
| Range of daily readings, current efficiency (%) | 96.5–98.4 | 91.1–98.5 |
| Final cell voltage (V) | 3.44 | 3.54 |
| Range of cell voltage (V) | 3.42–3.47 | 3.53–3.60 |

The sample gave better results than the control, particularly in voltage. The advantage in current efficiency is surprising.

Example 3

Example 2 is repeated, except the sulfonyl polymer used in the yarn and the sulfonyl films are made from $CF_2$=$CFOCF_2CF_2SO_2F$ (see a paper by Ezzell et al. presented at the AIChE meeting in Houston on 3/27/85) and has a mole ratio of 11.8:1. The total thickness of this copolymer in the laminated membrane is only 75 micrometers. The current efficiency and voltage are comparable to those in Example 2.

Example 4

Example 2 is repeated, except the sulfonyl polymer used in the yarn and the sulfonyl films is made from $CF_2$=$CFO[CF_2CF(CF_3)O]_2OCF_2CF_2SO_2F$ and has a mole ratio of 2.8:1. The current efficiency and voltage are about the same as those in Example 2.

Example 5

Example 2 was repeated, except the laminate was made using a 25 micrometer thick film of a 6.78:1 copolymer of TFE and $CF_2$=$CFOCF_2CF(CF_3)OCF_2CF_2SO_2F$ and a 100 micrometer thick film of the same copolymer. The control used the same two ion exchange films, but the fabric was PTFE. The current efficiencies were poor because the ratio of monomers is unsuitable for 32% NaOH. The other results were:

|  | Sample | Control |
| --- | --- | --- |
| Days on line | 23 | 23 |
| Final cell voltage (V) | 3.26 | 3.51 |
| Range of cell voltage (V) | 3.16–3.33 | 3.27–3.71 |

Example 6

The drawn, hydrolyzed yarns made in Example 1 were woven into a fabric with 1.2 yarns/cm in the warp direction and 1.2 yarns/cm in the weft direction. The fabric was laminated into a membrane by placing the fabric on a 50 micrometer thick film of a 6.4:1 TFE: $CF_2$=$CFOCF_2CF(CF_3)OCF_2CF_2COOCH_3$ copolymer, and placing on the fabric a 50 micrometer film of the same film, turning the sandwich over and placing it on a porous release paper, and radiantly heating the sandwich from above to 225° C. while applying a vacuum of 71 kPa through the release paper for 15 seconds. After cooling, the release paper was removed.

A control membrane was made which was substantially the same except the fabric was made of PTFE yarn of 200 denier.

Portions of the sample membrane and the control membrane were hydrolyzed and used in electrolysis as in Example 2. The results were:

|  | Sample | Control |
| --- | --- | --- |
| Days on line | 24 | 24 |
| Final caustic current efficiency (%) | 96.0 | 95.5 |
| Range of daily readings current efficiency (%) | 95.5–98.7 | 90.7–96.3 |
| Final cell voltage (V) | 3.52 | 3.57 |
| Range of daily readings (V) | 3.49–3.58 | 3.52–3.66 |

The sample gave better results than the control. The advantage in current efficiency is surprising.

Example 7

Example 2 is repeated except the yarn count is 30 yarns/cm in each of the warp and weft directions. The cell voltage is substantially the same as in Example 2.

What is claimed is:

1. A carboxyl/sulfonyl bimembrane comprising at least one film layer of a copolymer having sulfonyl groups in melt-fabricable form and at least one film layer of a copolymer having carboxyl groups in melt-fabricable form; at least one said sulfonyl-group layer having adhered therein a fabric reinforcement made from yarn that is oriented and then at least partially hydrolyzed, said yarn being made of a fluorinated cation exchange resin precursor having sulfonyl monomer as functional monomer and in which the mole ratio of a non-functional monomer to said functional monomer in the yarn is 2.8–11.8:1, the sulfonyl layer having a mole ratio of non-functional to functional monomer which differs from that of the yarn by no more than 3 units.

2. An improved process for the electrolysis of an alkali metal halide to make a halogen and an alkali metal hydroxide, the improvement comprising use of the membrane of claim 1.

3. A fluorinated cation exchange membrane comprising one or more layers of an ion-conductive film and where one or more said layers has adhered therein a fabric reinforcement made from fully ion conductive yarn that is oriented and then at least partially hydrolyzed, the film and the yarn being made of melt-fabricable fluorinated cation exchange resin precursors having a mole ratio of non-functional to functional monomer of 2.8–11.8:1, the mole ratio in the film adjacent to the fabric being different from that of the fabric by no more than three units.

4. The fluorinated cation exchange membrane of claim 1 wherein the functional monomer is carboxyl monomer.

5. The membrane of claim 4 wherein the fabric is woven and has a yarn count of from 1 to 40 yarns per centimeter in each direction.

6. The membrane of claim 5 wherein the yarn count is from 25 to 35 yarns per centimeter in each direction.

7. An improved process for the electrolysis of an alkali metal halide to make a halogen and an alkali metal hydroxide, the improvement comprising use of the membrane of claim 6.

8. An improved process for the electrolysis of an alkali metal halide to make a halogen and an alkali metal hydroxide, the improvement comprising use of the membrane of claim 4.

* * * * *